United States Patent
Liu

(10) Patent No.: US 9,111,584 B2
(45) Date of Patent: Aug. 18, 2015

(54) MOUNTING STRUCTURE FOR DATA STORAGE DEVICE AND ELECTRONIC DEVICE USING THE SAME

(71) Applicants: Inventec (Pudong) Technology Corporation, Shanghai (CN); INVENTEC CORPORATION, Taipei (TW)

(72) Inventor: Chao-Chih Liu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 259 days.

(21) Appl. No.: 13/787,156

(22) Filed: Mar. 6, 2013

(65) Prior Publication Data

US 2014/0139993 A1    May 22, 2014

(30) Foreign Application Priority Data

Nov. 20, 2012   (CN) .......................... 2012 1 0472399

(51) Int. Cl.
*H05K 5/00* (2006.01)
*H05K 7/00* (2006.01)
*G11B 33/12* (2006.01)

(52) U.S. Cl.
CPC ............ *G11B 33/128* (2013.01); *G11B 33/124* (2013.01)

(58) Field of Classification Search
CPC ... G11B 33/124; G11B 33/123; G06K 7/0013
USPC ............... 361/679.01–679.09, 679.1–679.19, 361/679.21–679.29, 679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8; 369/75.1, 75.2, 369/75.11, 75.21, 76, 77.11, 77.21, 78, 79, 369/80, 81, 82
See application file for complete search history.

(56) References Cited

U.S. PATENT DOCUMENTS

| | | | | |
|---|---|---|---|---|
| 6,370,608 | B2* | 4/2002 | Yamada et al. ............... | 710/301 |
| 2002/0001181 | A1* | 1/2002 | Kondo .......................... | 361/728 |
| 2008/0023370 | A1* | 1/2008 | Lin et al. ...................... | 206/722 |

* cited by examiner

*Primary Examiner* — Jerry Wu
(74) *Attorney, Agent, or Firm* — Locke Lord LLP; Tim Tingkang Xia, Esq.

(57) ABSTRACT

A mounting structure for a data storage device includes a receiving member and a fastening member. The receiving member has a bottom wall and a side wall and the data storage device is located between the bottom wall and the side wall. The bottom wall has a first edge and a second edge adjacent to each other. The fastening member is disposed inside the receiving member and can rotate pivotally between the first edge and the second edge. The fastening member includes a rod member, a hook and an elastic piece. When the data storage device is enclosed in the receiving member, the rod member and the elastic piece sandwich and lean against the data storage device and the hook clasps on the data storage device. When the hook is off the data storage device, the elastic piece pushes the data storage device out from the receiving member.

9 Claims, 6 Drawing Sheets

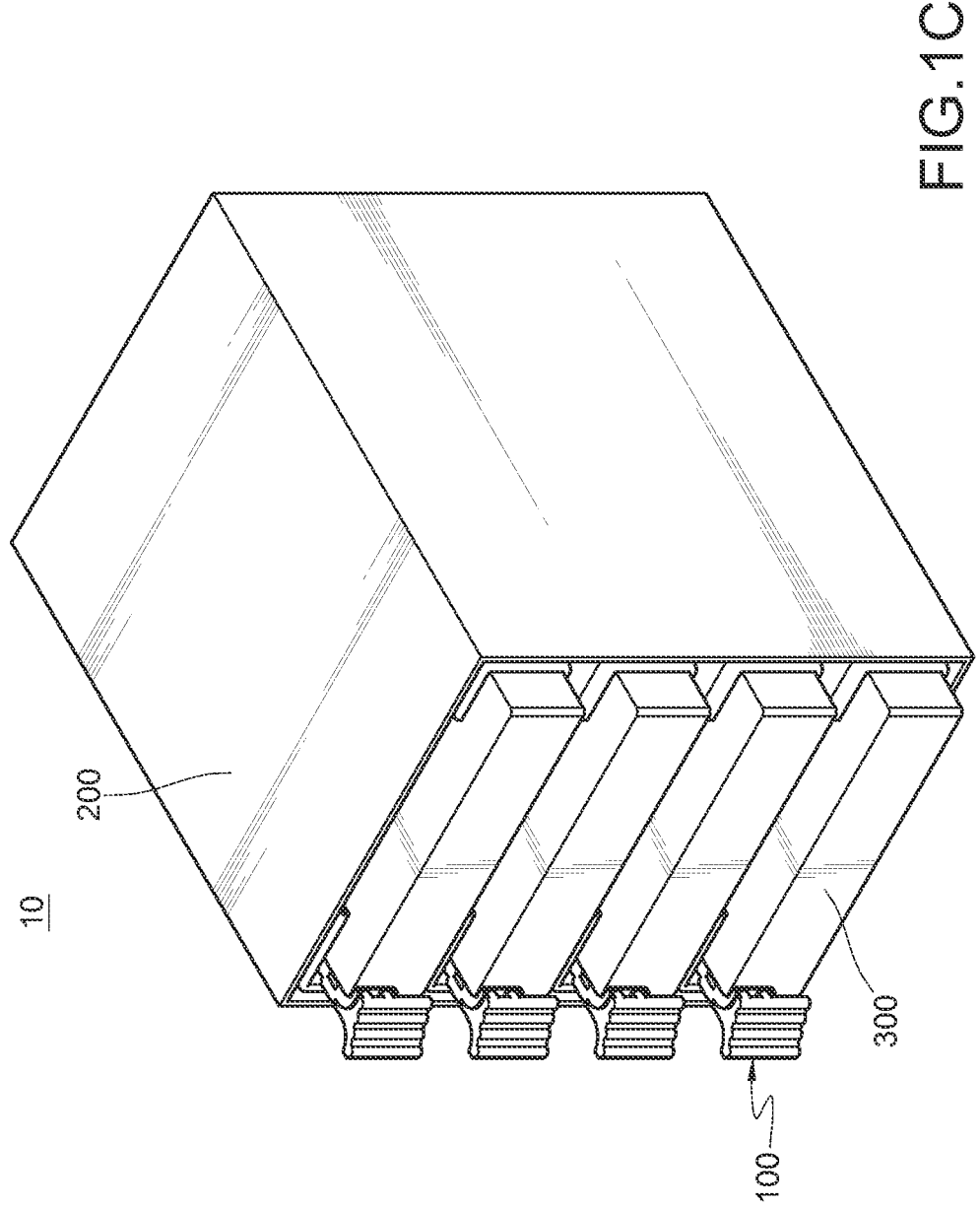

MOUNTING STRUCTURE FOR DATA STORAGE DEVICE AND ELECTRONIC DEVICE USING THE SAME

CROSS-REFERENCE TO RELATED APPLICATIONS

This non-provisional application claims priority under 35 U.S.C. §119(a) on Patent Application No(s). 201210472399.4 filed in China, P.R.C. on Nov. 20, 2012, the entire contents of which are hereby incorporated by reference.

BACKGROUND OF THE INVENTION

1. Technical Field of the Invention

The disclosure relates to an electronic device, more particular to an electronic device having a mounting structure for the data storage device.

2. Description of the Related Art

The computer equipments available these days require data storage devices in order to store a variety of information. In most cases, users apply screw directly to hold the data storage device in the case of the computer equipment. For optimization of the use of a limited space, generally a plurality of data storage devices are stacked in a bracket or mounted in a rack.

However, such approach is time-consuming and inconvenient in terms of installation or removal the data storage devices due to a restricted and limited space. Given that effectiveness is crucial, more time spent on the installation or removal of the data storage devices is not considered to be cost effective.

Therefore, to develop methods for installing and removing the data storage devices quickly becomes a challenge to the related industries.

BRIEF DESCRIPTION OF THE DRAWINGS

The disclosure will become more fully understood from the detailed description given herein below for illustration only, and thus does not limit the disclosure, wherein:

FIG. 1C is a perspective view of electronic device using the mounting structure for the data storage device in FIG. 1A.

SUMMARY OF THE INVENTION

Figure 1A:
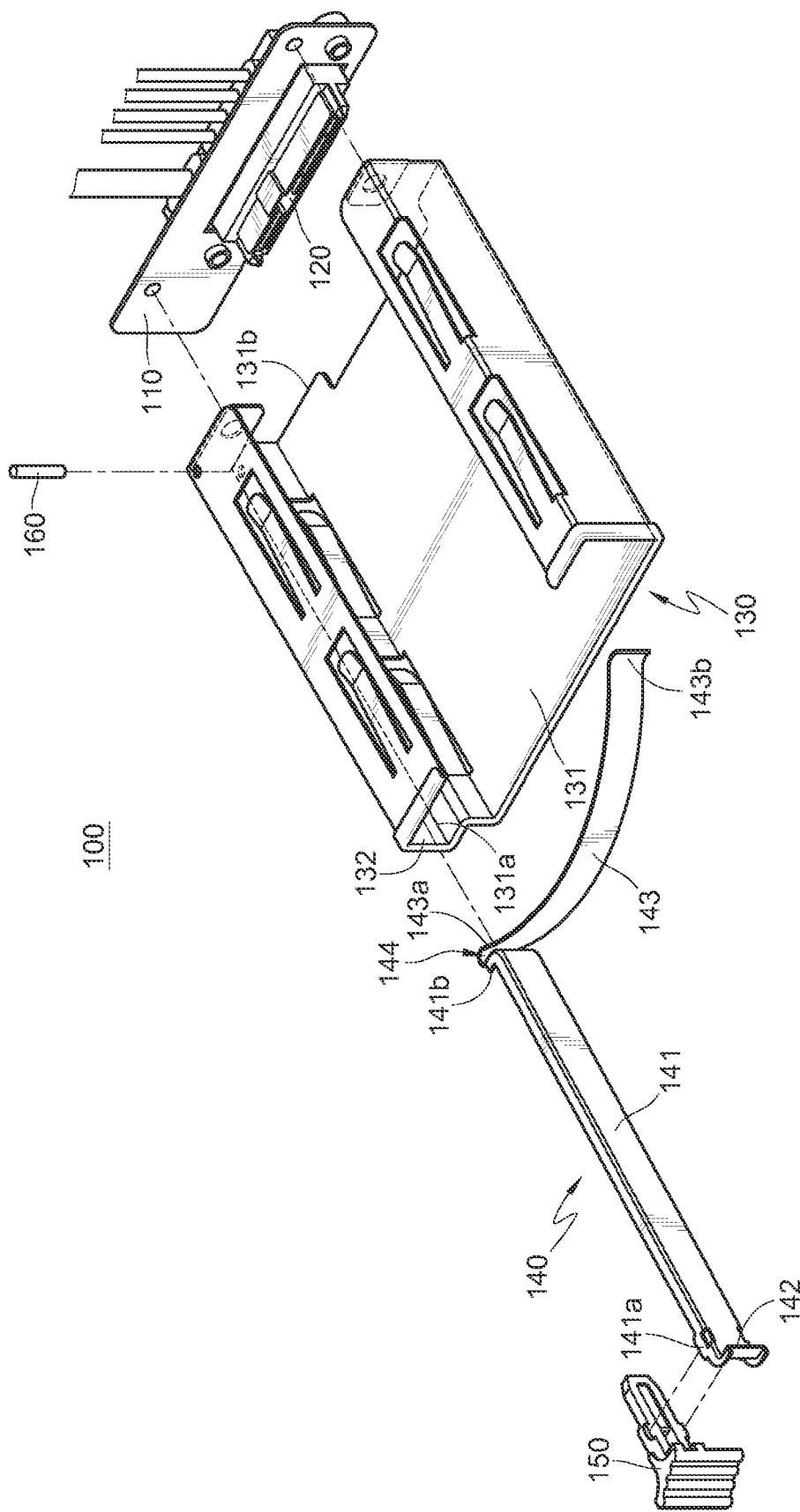
FIG. 1A is a perspective exploded view of the mounting structure for the data storage device according to an embodiment of the disclosure.

In an embodiment, the disclosure provides a mounting structure for a data storage device. The mounting structure is configured for mounting the data storage device. The mounting structure for the data storage device comprises a receiving member and a fastening member. The receiving member has a bottom wall and a side wall. The data storage device is configured for accommodating between the bottom wall and the side wall. The bottom wall has a first edge and a second edge adjacent to each other. The first edge is connected to the side wall. The fastening member is disposed inside the receiving member and configured for rotating pivotally between the first edge and the second edge. The fastening member comprises a rod member, a hook and an elastic piece. The rod member is located next to the side wall. The rod member has a first end and a second end. The second end faces toward the second edge. The hook is disposed at the first end of the rod member. The elastic piece has a connecting end, the connecting end connected to the second end. The elastic piece protrudes toward the first end. The connecting end and the second end are pivotally connected to the receiving member. When the data storage device is enclosed in the receiving member, the rod member and the elastic piece sandwich and lean against the data storage device and the hook clasps on the data storage device. When the hook is off the data storage device, the elastic piece pushes the data storage device out from the receiving member.

The disclosure further provides an electronic device comprising a case, a data storage device and a mounting structure. The mounting structure is configured for mounting the data storage device. The mounting structure comprises a back wall, a connection port, a receiving member and a fastening member. The connection port is disposed on the back wall. The connection port is electrically connected to the data storage device. The receiving member has a bottom wall and a side wall. The data storage device is disposed between the bottom wall and the side wall. The bottom wall has a first edge and a second edge adjacent to each other. The first edge is connected to the side wall and the second edge is connected to the back wall. The fastening member is disposed inside the receiving member and configured for rotating pivotally between the first edge and the second edge. The fastening member comprises a rod member, a hook and an elastic piece. The rod member is disposed next to the side wall. The rod member has a first end and a second end. The second end faces toward the second edge. The hook is disposed at the first end of the rod member. The elastic piece has a connecting end. The connection end is connected to the second end. The elastic piece protrudes towards the first end. The connection end and the second end are pivotally connected to the receiving member. The rod member and the elastic piece sandwich and lean against the data storage device. When the hook is off the data storage device, the elastic piece pushes the data storage device out from the receiving member.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
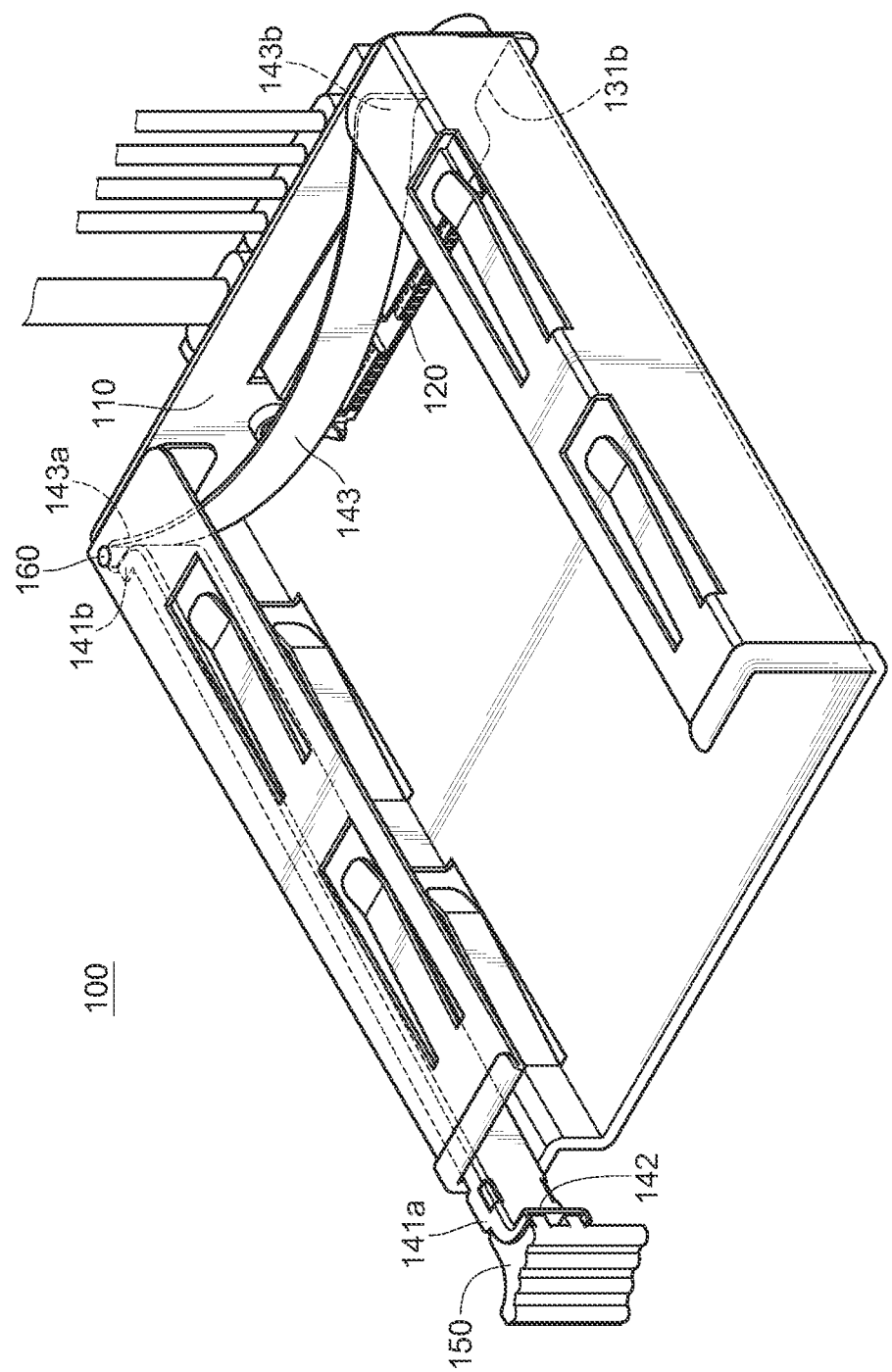
FIG. 1B is a perspective view of the mounting structure for the data storage device in FIG. 1A.

Please refer to FIG. 1A, FIG. 1B, and FIG. 1C. FIG. 1A is a perspective exploded view of the mounting structure for the data storage device according to an embodiment of the disclosure. FIG. 1B is a perspective view of the mounting structure for the data storage device in FIG. 1A. FIG. 1C is a perspective view of electronic device using the mounting structure for the data storage device in FIG. 1A. The electronic device of the disclosure 10 comprises a case 200, a data storage device 300 and a mounting structure 100. The mounting structure 100 is configured for accommodating the data storage device 300 in the case 200. The case 200 is configured for holding the at least one mounting structure 100 to hold the at least one data storage device 300. In this and some other embodiments, the data storage device 300 is a solid state disk or a solid state drive (SSD). The mounting structure 100 comprises a receiving member 130, a fastening member 140, a back wall 110 and a connection port 120. The receiving member 130 has a bottom wall 131 and a side wall 132. The data storage device 300 is disposed in between the bottom wall 131 and the side wall 132. The bottom wall 131 has a first edge 131a and a second edge 131b adjacent to each other. The first edge 131a is connected to the side wall 132. The back wall 110 is disposed at the second edge 131b in the case 200 and thus connected to the second edge 131b. The connection port 120 is disposed at the second edge 131b and located inside the case 200. When the data storage device 300 is disposed in the receiving member 130, the data storage device 300 is electrically connected to the connection port 120.

The fastening member 140 is disposed inside the receiving member 130 and configured for rotating pivotally between the first edge 131a and the second edge 131b. The fastening member 140 comprises a rod member 141, a hook 142 and an elastic piece 143. The rod member 141 is located next to the side wall 132. The rod member 141 has a first end 141a and a second end 141b. The second end 141b faces toward the second edge 131b. The hook 142 is disposed at the first end 141a of the rod member 141 and clasps on to the data storage device 300. The elastic piece 143 has a connecting end 143a. The connecting end 143a is connected to the second end 141b. The connecting end 143a and the second end 141b are pivotally connected to the receiving member 130. The elastic piece 143 protrudes toward the first end 141a. When the data storage device 300 is enclosed in the receiving member 130, the rod member 141 and the elastic piece 143 sandwich and lean against the data storage device 300. Once the hook 142 is off the data storage device 300, the elastic piece 143 pushes the data storage device 300 out of the receiving member 130.

In this and some other embodiments, the elastic piece 143 is in an arc shape protruding toward the first end 141a of the rod member. The elastic piece 143 has a suspended end 143b opposite to the connecting end 143a. The suspended end 143b is against the back wall 110. The mounting structure 100 further comprises a handle 150 disposed to the hook 142. The handle 150 is configured for pushing the hook 142 away from the data storage device 300. The mounting structure further comprises a pivot shaft 160. The fastening member 140 has a through slot 144 formed in between the second end 141b and the connecting end 143a. The pivot shaft 160 is through the through slot 144 in order that the fastening member 140 is pivotally connected to the receiving member 130.

Figure 2A:
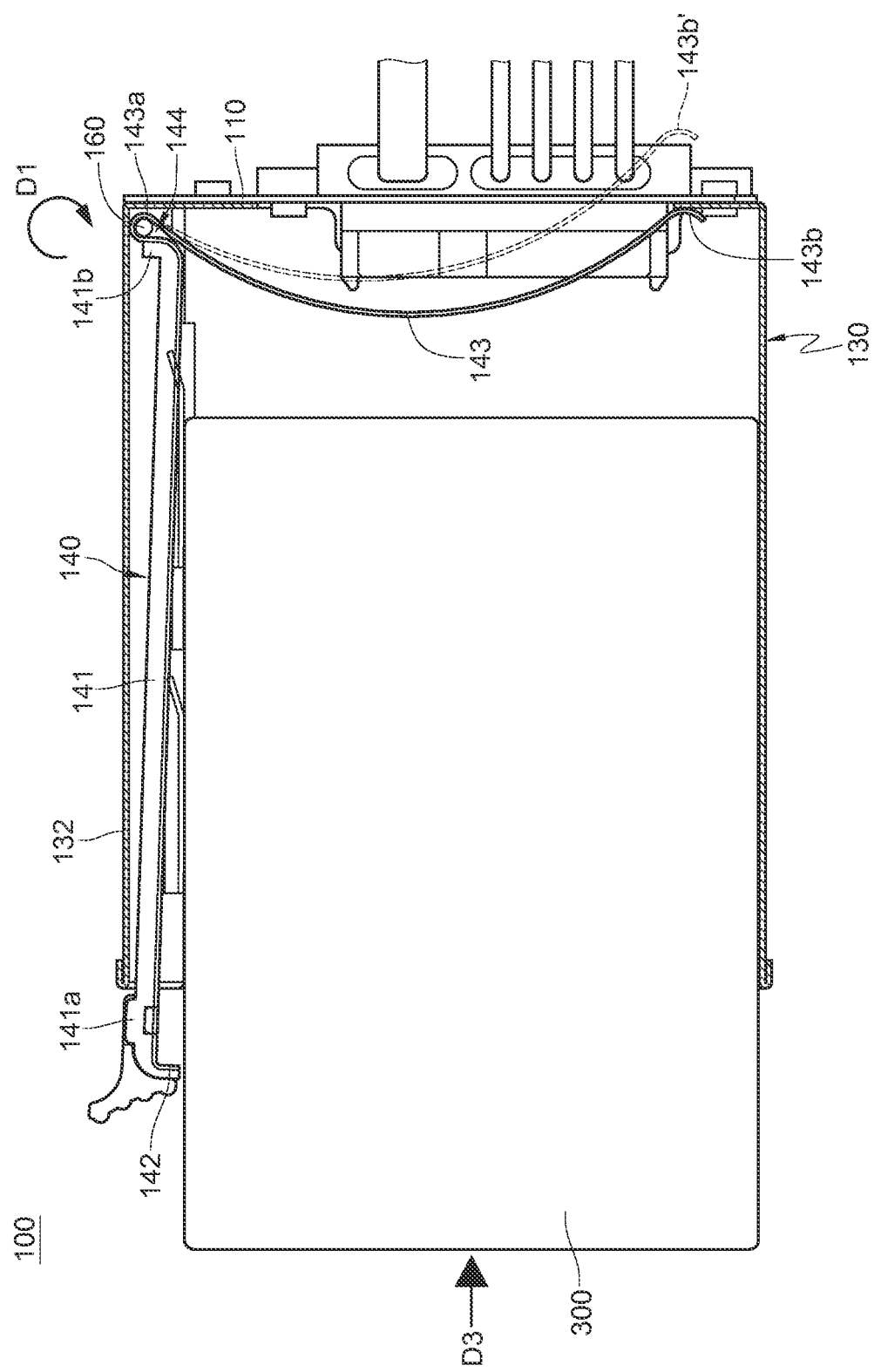
FIGS. 2A, 2B and 2C are the sectional top views of the mounting structure and the data storage device of the disclosure in FIG. 1C.
Figure 2B:
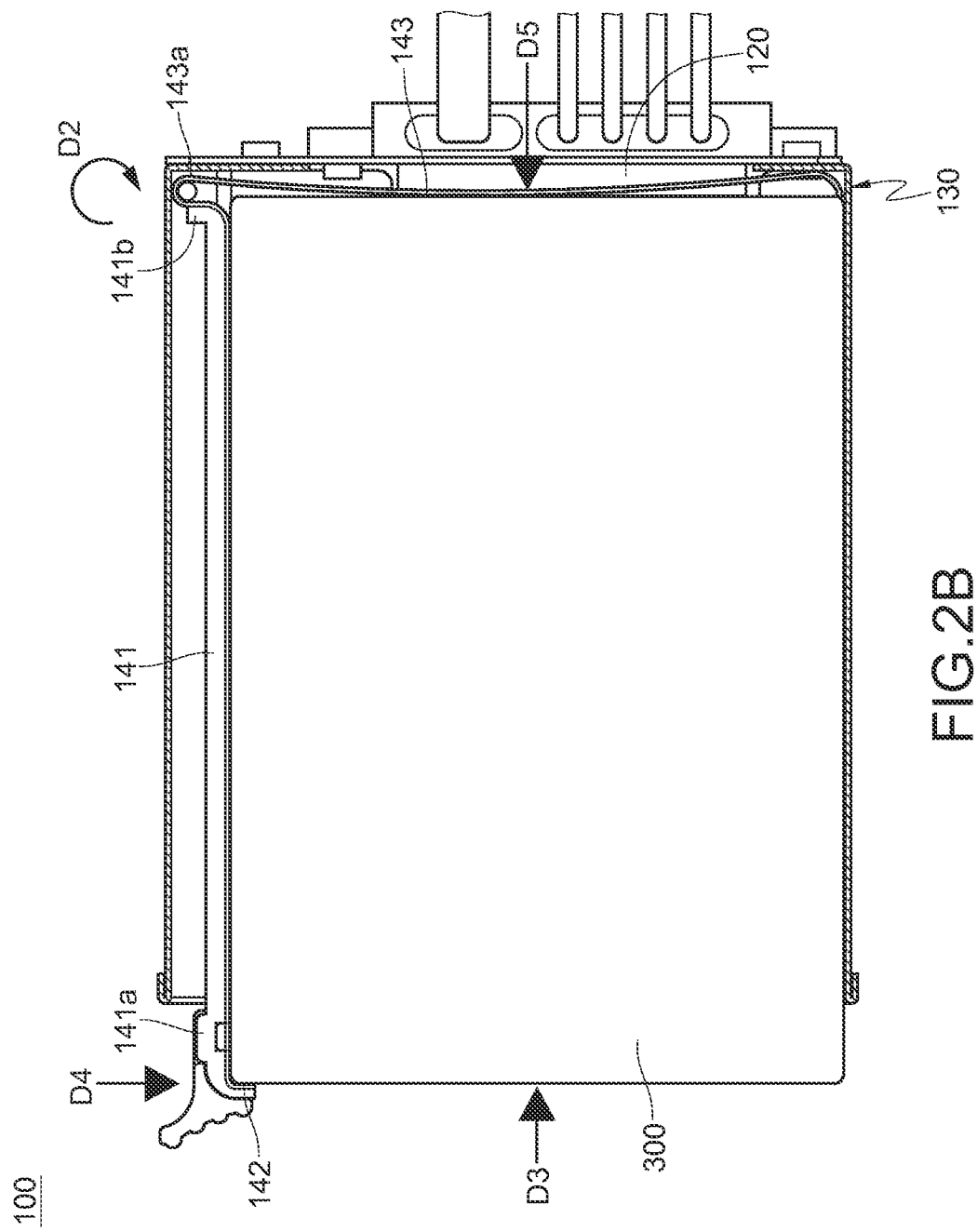
Figure 2C:
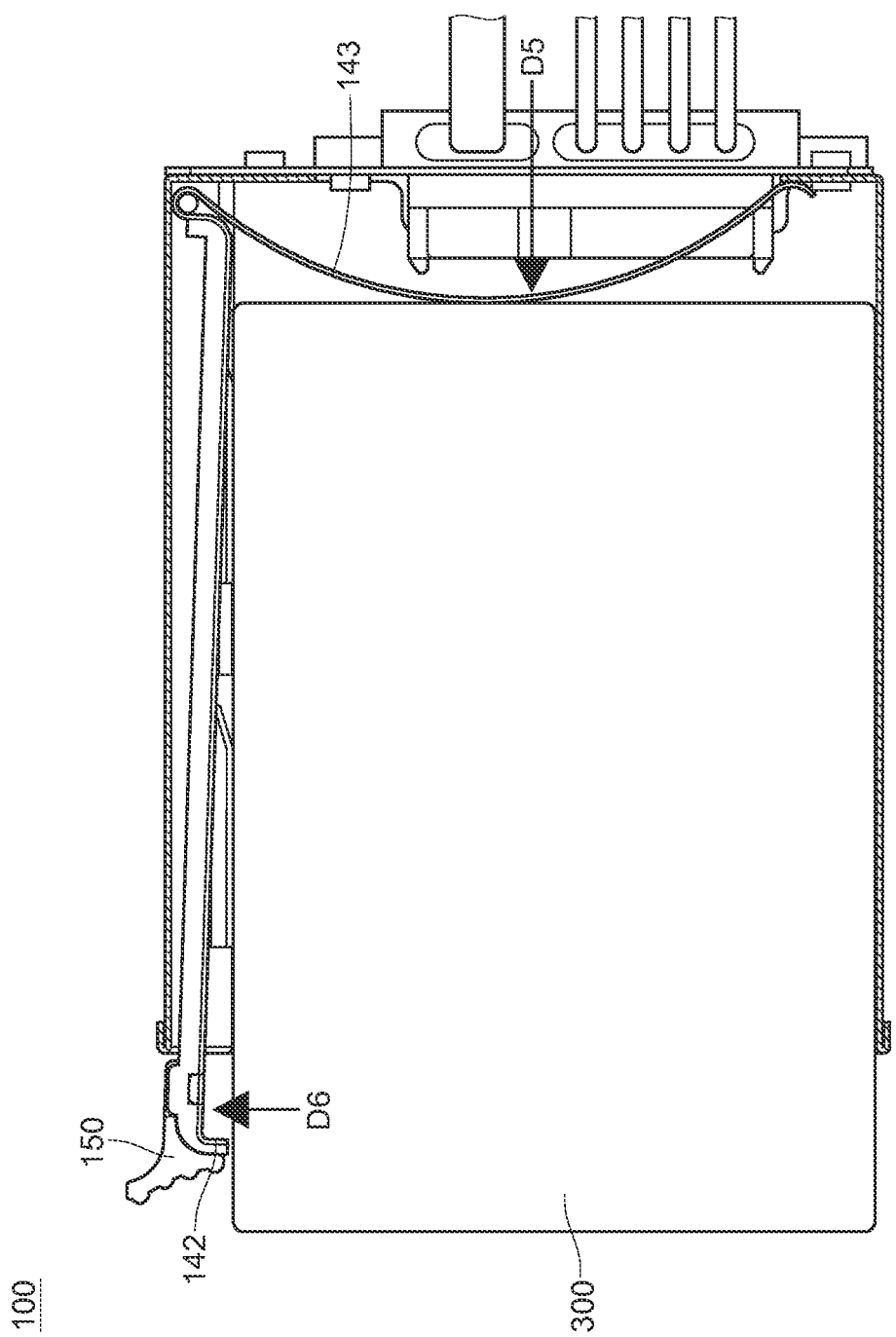

Please refer to FIG. 2A, FIG. 2B, and FIG. 2C. FIG. 2A, FIG. 2B, and FIG. 2C are the sectional top views of the mounting structure 100 and the data storage device 300 of the disclosure in FIG. 1C. According to FIG. 2A, before the back wall 110 is disposed in the mounting structure 100, the suspended end 143b' reaches beyond the boundary of the receiving member 130 as shown in the dotted line. Once the back wall 110 is disposed in the mounting structure 100, the suspended end 143b is positioned against the back wall 110 as shown in the solid line. Thus, the back wall 110 is configured for turning pivotally around the pivot shaft 160 as the pivotal axis in a clockwise direction D1 and pushes the fastening member 140. The rod member 141 of the fastening member 140 is blocked by the side wall 132 stopping the fastening member 140 from rotating in the clockwise direction D1. Since the first end 141a of the rod member 141 is configured for leaning against the side wall 132, the hook 142 is in a position that does not affect the insertion of the data storage device 300 sliding into the receiving member 130 in the installation direction D3.

According to FIG. 2B, when the data storage device 300 is slid into the receiving member 130 in the installation direction D3, the data storage device 300 pushes the elastic piece 143 in the installation direction D3. Thereby, the connecting end 143a of the elastic piece 143 turns pivotally in the counterclockwise direction D2. The second end 141b connected to the connecting end 143a also turns pivotally in the counterclockwise direction. The hook 142 turns pivotally in the counterclockwise direction D2 and leans against the data storage device 300. When the data storage device 300 continues sliding into the receiving member 130 in the installation direction D3 and enters the area between the hook 142 and the second end 141b, the rod member 141 leans against the data storage device 300 in the retaining direction D4 and the hook 142 blocks in the path where the data storage device 300 is slid out. Thereby, while the elastic piece 143 pushes the data storage device 300 toward the removal direction D5, the hook 142 clasps on the data storage device 300 and prevents the data storage device 300 from leaving the receiving member 130. At this point, the data storage device 300 is electrically connected to the connection port 120.

According to FIG. 2C, to remove the data storage device 300 from the mounting structure 100, the users push the handle 150 to the releasing direction D6, opposite to the retaining direction D4. Thereby, the hook 142 is off the path where the data storage device 300 is slid out in the removal direction D5. The elasticity of the elastic piece 143 pushes the data storage device 300 toward the removal direction D5 in order that the data storage device 300 is configured for dismounting along the removal direction D5.

In summary, the disclosure provides a method to store the data storage device in the case using a hook in a fastening member to clasp on the data storage device. For removing the data storage device from the case, users may release the hook from the data storage device, and then the elastic piece of the fastening member pushes the data storage device out from the receiving member.

What is claimed is:

1. A mounting structure for a data storage device, the mounting structure being configured for mounting the data storage device, the mounting structure comprising:
   a receiving member having a bottom wall and a side wall, the data storage device being configured for accommodating between the bottom wall and the side wall, the bottom wall having a first edge and a second edge adjacent to each other, the first edge being connected to the side wall; and
   a fastening member being disposed inside the receiving member for being pivotally connected to the receiving member, the fastening member comprising:
      a rod member located next to the side wall, the rod member having a first end and a second end, the second end facing toward the second edge;
      a hook integrally formed at the first end of the rod member; and
      an elastic piece having a connecting end, the connecting end being connected to the second end, the elastic piece protruding toward the first end, the connecting end and the second end being pivotally connected to the receiving member;
   wherein when the data storage device is enclosed in the receiving member, the rod member and the elastic piece sandwich and lean against the data storage device and the hook clasps on the data storage device, and when the hook is off the data storage device, the elastic piece pushes the data storage device out from the receiving member.

2. The mounting structure for the data storage device according to claim 1, further comprising a connection port disposed at the second edge, the connection port being electrically connected to the data storage device when the data storage device is located in the receiving member.

3. The mounting structure for the data storage device according to claim 1, further comprising a back wall disposed at the second edge, the elastic piece being in an arc shape protruding toward the first end, the elastic piece having a suspended end opposite to the connecting end, the suspended end being against the back wall.

4. The mounting structure for the data storage device according to claim 1, further comprising a handle disposed to the hook, the handle is configured for pushing the hook away from the data storage device.

5. The mounting structure for the data storage device according to claim 1, further comprising a pivot shaft, the fastening member has a through slot formed in between the second end and the connecting end, the pivot shaft being disposed through the through slot in order that the fastening member is pivotally connected to the receiving member.

6. An electronic device, comprising:
a case;
a data storage device; and
a mounting structure configured for mounting the data storage device, the mounting structure comprising:
a back wall disposed in the case;
a connection port disposed on the back wall, the connection port being electrically connected to the data storage device;
a receiving member having a bottom wall and a side wall, the data storage device being disposed between the bottom wall and the side wall, wherein the bottom wall has a first edge and a second edge adjacent to each other, the first edge is connected to the side wall and the second edge is connected to the back wall; and
a fastening member being disposed inside the receiving member for being pivotally connected to the receiving member, the fastening member comprising:
a rod member disposed next to the side wall, the rod member having a first end and a second end, the second end facing toward the second edge;
a hook integrally formed at the first end of the rod member and clasping the data storage device;
and an elastic piece having a connecting end, the connection end being connected to the second end, the elastic piece protruding towards the first end, the connection end and the second end being pivotally connected to the receiving member, the rod member and the elastic piece sandwiching and leaning against the data storage device when the hook is clasping the data storage device;
wherein when the hook is off the data storage device, the elastic piece pushes the data storage device out from the receiving member.

7. The electronic device according to claim 6, wherein the elastic piece is in an arc shape protruding toward the first end, the elastic piece has a suspended end opposite to the connecting end, and the suspended end is against the back wall.

8. The electronic device according to claim 6, wherein the mounting structure further comprises a handle disposed on the hook, and the handle is configured for pushing the hook away from the data storage device.

9. The electronic device according to claim 6, wherein the mounting structure further comprises a pivot shaft, the fastening member has a through slot formed in between the second end and the connecting end, and the pivot shaft is disposed through the through slot in order that the fastening member is pivotally connected to the receiving member.

\* \* \* \* \*